3,335,013
FROZEN DESSERTS
Howard J. Wolfmeyer, Arlington Heights, Ill., assignor to Corn Products Company, New York, N.Y., a corporation of Delaware
No Drawing. Filed Jan. 27, 1964, Ser. No. 340,541
5 Claims. (Cl. 99—136)

This invention relates to a new sweetener composition and to the use thereof in frozen desserts. More particularly, it relates to a sweetener, comprised substantially of starch hydrolysate sirups or solids and mono- and disaccharides, but containing little or no sucrose.

It is well known in the art that starch hydrolysates, such as corn sirups and the solids derived therefrom, can be used to a limited extent in combination with sucrose as sweeteners for frozen desserts. The starch hydrolysate sirups, such as corn sirups, when used in limited amounts contribute, or aid in contributing, certain desirable properties to the frozen dessert, for example, proper body and texture, freeze-thaw and melt-down characteristics. The degree to which each of the aforementioned properties is imparted to the frozen dessert depends upon the quantity and type of sirup used. The main properties in frozen desserts which are affected by the various ingredients therein, including sweeteners, and which it is desired to control are:

(1) Freezing point and freeze-thaw stability.
(2) Melt-down.
(3) Chewiness.
(4) Smoothness, e.g., no graininess due to crystallization of certain sugars, i.e., lactose and sucrose.
(5) Flavor.
(6) Sweetness.

It is believed that a few comments regarding these properties and the effect, on frozen desserts, of some of the components in the sweetener will be useful to a better understanding of the present invention and the problem which it solves.

Freezing point and freeze-thaw stability are closely interrelated. It is known that lower molecular weight bodies depress the freezing point of frozen desserts the most and higher molecular weight bodies, the least. If the freezing point of an ice cream mix, for example, is depressed too much, the mix will not freeze at the temperature range used for freezing ice cream, e.g., about 18 to 24° F., and the ice cream will be too soft. On the other hand, if the freezing point is not low enough, the ice cream will become too hard at this range. Furthermore, frozen desserts must withstand fluctuations in temperature from the time they are frozen until they are served. For example, ice creams are generally frozen at 18 to 24° F., stored at temperatures as low as −20° F., distributed at temperatures of −5 to 10° F., stored again just prior to use at 0 to 20° F. During this time, when they are subject to sharp changes in temperatures, they must retain their proper structure. High molecular weight bodies aid in freeze-thaw stability by virtue of the fact that they depress the freezing point less than the lower molecular weight bodies and also have certain water binding properties.

A frozen dessert should have proper melt down characteristics, that is, it should not melt too slowly nor too quickly. Also it should have a smooth liquid consistency upon melting, its components should not separate from each other. If too many low molecular weight materials are present, it may melt too quickly and the components may separate from each other and, if too many high molecular weight components are present, it may not melt as quickly as desired.

Higher molecular weight bodies impart chewiness to ice creams, but, if present in excessive amounts, the ice cream becomes gummy and rubbery.

In order to maintain smoothness in frozen desserts, crystallization of carbohydrate components should be avoided as well as the formation of large ice crystals. It is known that the more different saccharides there are present in a frozen dessert, the more the crystallization of each individual saccharide is inhibited. The water binding capacity of the higher molecular weight bodies aids in preventing the formation of ice crystals.

It is desirable also that there be no interference with or masking of flavors which are added to the frozen dessert mix, e.g., vanilla, various fruit flavors. It is known that certain ingredients in a sweetening composition can impart new, undesirable off-flavors or characteristic flavors of their own to the mix. Therefore, care must be exercised in using sweeteners which do not detract from the flavors but rather enhance them.

Sucrose has always been used in substantial amount to provide sweetness in frozen desserts. Hence, any substitute for sucrose must not interfere with the sweet taste associated with sucrose. Therefore, any material used in combination with sucrose must not only be compatible in all respects therewith, but also must not interfere with the other desirable properties of a frozen dessert.

The effects, both desirable and undesirable, of corn sirups and their various components on the various properties of frozen desserts, when used in limited amounts in combination with sucrose as a sweetener, are known. For example, it has been suggested that up to 50 percent, dry basis, of the sweetener used in frozen desserts (exclusive of sugars naturally occurring in other ingredients) may be corn sirup. In common practice, sweeteners for frozen desserts consist of about 33 to 40 percent, dry basis, of corn sirup and the balance, sucrose. It is generally accepted by those skilled in the art that it is not possible to use more than about 50 percent of corn sirups, dry basis, of the sweetener in frozen desserts because the disadvantages at higher levels off-set the advantages. For example, inasmuch as corn sirups are not as sweet as sucrose, it is believed that a large proportion of the sweetener must consist of sucrose. Further, certain flavors, e.g., cereal flavors, are associated with corn sirups and these are believed to be imparted to the final product or to mask added flavors. In addition, the other effects of the components on freezing, stability, body and texture are said to be either too great or too little.

It is desirable at times, for economical and other reasons, to replace all or substantially all of the sucrose used as sweetener in frozen desserts with other sweeteners, e.g., corn sirups or corn sirup solids. However, for various reasons some of which are set forth above, this has not been accomplished, as far as applicant is aware. Nor is this surprising when all of the problems to be overcome are taken into account.

An object of the present invention is to provide a new sweetener for frozen desserts which has economical advantages over those used heretofore. Another object is to provide a sweetener for frozen desserts which contains much higher concentrations of starch hydrolysate sirups than heretofore. A further object is to provide a sweetening composition for frozen desserts which contains little or no sucrose. Another object is to provide a new sweetener which has a balance of carbohydrates of various molecular weights which will contribute advantageously to the attainment of the aforementioned desired properties in a frozen dessert. Other objects will appear hereinafter.

I have discovered that a certain combination of starch hydrolysates and monosaccharides and disaccharides will fulfill the foregoing objects. My new and novel sweetener may be used in all frozen desserts, e.g., ice creams, imitation ice creams, sherbets, ices, and the like.

My new and improved sweetener comprises a combination of starch hydrolysate sirups or solids and mono- and disaccharides to provide a mixture consisting essentially of the following, on a dry basis:

| | Percent |
|---|---|
| Maltose | About 30 to about 70 |
| Dextrose | About 10 to about 40 |
| Levulose | About 3.5 to about 20 |
| Sucrose | None to about 10 |
| Polysaccharides consisting of penta and higher saccharides | About 10 to about 45 |

(The above sweetening composition is exclusive of any sugars occurring naturally in the other ingredients of a frozen dessert, e.g., lactose, fruit sugars.)

The above composition may be prepared in a number of ways, the preferred being to mix a starch hydrolysate sirup having a D.E. value within the range of about 24 to 64 percent with a small amount of sirup containing a mixture of dextrose and levulose. A corn sirup which has a high maltose content, e.g., 40 percent or more, can be used advantageously to provide the maltose and higher polysaccharides. The dextrose and levulose may be derived from the well known invert sirups or from sirups prepared by interconversion of dextrose to levulose, and the like. Generally, no sucrose is needed, but its presence in small amounts, e.g., from partially inverted sucrose sirups, is not objectionable.

When the above described sweetening composition is used in all types of frozen desserts in place of sweeteners known and used in the prior art and in the same amount, the finished desserts are satisfactory in all respects, and even excel those presently known in certain respects, as will be shown more fully hereafter.

Typical analyses of starch hydrolysate sirups which are preferable for use in my invention are set forth below:

TABLE I

| | A | B |
|---|---|---|
| Dextrose Equivalent (D.E.) | 50 | 43 |
| Baumé, degrees | 43 | 43 |
| Carbohydrate Analysis (Dry Basis): | | |
| Dextrose | 9.1 | 5.9 |
| Maltose | 51.9 | 44.4 |
| Trisaccharides | 15.1 | 12.7 |
| Tetrasaccharides | 1.7 | 3.3 |
| Pentasaccharides | 1.3 | 1.8 |
| Hexasaccharides | 1.5 | 1.5 |
| Heptasaccharides and higher | 19.4 | 30.4 |

The following examples which are typical and informative only and in no way intended to limit the invention will further illustrate the invention.

*Example I*

A basic formula for ice cream was used, as follows:

| | Percent, dry basis |
|---|---|
| Fat | 10.1 |
| Milk (non-fat) solids | 10.1 |
| Sweetener | 18 |
| Stabilizer and emulsifier | 0.3 |
| Water (and flavor) | balance. |

Five sweeteners were prepared by mixing from 70 to 90 percent (d.b.) of a corn sirup (sirup A in Table I) with invert sirups consisting of various combinations of dextrose and levulose. The sweeteners had the following compositions, dry basis:

| | a | b | c | d | e |
|---|---|---|---|---|---|
| Levulose, percent | 4.8 | 10.0 | 10 | 12.5 | 5 |
| Dextrose, percent | 31.5 | 26.3 | 26.3 | 18.75 | 13 |
| Maltose, percent | 36.4 | 36.4 | 36.4 | 39 | 46.8 |
| Penta and higher saccharides, percent | 15.4 | 15.4 | 15.4 | 16.5 | 20 |

The ice creams were prepared in commercial equipment in accordance with standard practice. All of the ice creams were satisfactory in all respects. They had better creaminess and storage stability than ice creams made with comparable amounts of milk solids and prior art sweeteners, there being no evidence of sandiness or large ice crystals. Product (b) was preferred because of its exceptionally fine sweetness and flavor level.

The ice creams were evaluated upon manufacture and upon 75 days storage thereafter, and found to be satisfactory in all respects.

*Example II*

The following formula was used in the preparation of an orange ice:

| | | |
|---|---|---|
| Total invert sirup (d.b.) | g | 244.8 |
| Dextrose (d.b.) | g | 122.4 |
| Corn sirup (d.b.) (sirup A in Table I) | | 857.4 |
| Water | lbs | 4.2 |
| Gum tragacanth | g | 20 |
| Frozen orange puree | oz | 4 |

The above ingredients were mixed together and frozen in standard equipment under standard freezing conditions for making ices. The resultant product was very satisfactory as regards taste, flavor, stability, texture, and body.

*Example III*

When the formula in Example II is changed by using 9.8 grams of sucrose and 235 grams of total invert sirup, substantially the same results are obtained.

It was indeed surprising that may new sweetener not only met all of the commonly accepted requirements of a good frozen dessert but even excelled in some respects. For example, in ice creams, in addition to achieving satisfactory levels of sweetness and flavor enhancement, it was possible to use lower levels of fat and still obtain the desired creaminess. The ice creams made in accordance with my invention had unusually good creaminess. In addition, all the products had good storage stability, there being no evidence of sandiness nor separation of any of the components. In general, the overall results obtained by the use of my new sweetener are better than those obtained from previous combinations of corn sirups and sucrose used in the prior art. I attribute the success of my new sweetener to the proper balance and amounts of the different types of carbohydrates present therein.

I claim:

1. A new composition for use as a sweetener in frozen desserts consisting essentially of, on a dry basis,

| | Percent |
|---|---|
| Maltose | About 30 to about 70 |
| Dextrose | About 10 to about 40 |
| Levulose | About 3.5 to about 20 |
| Sucrose | None to about 10 |
| Polysaccharides consisting of penta and higher saccharides | About 10 to about 45 |

2. A frozen dessert composition containing as its sweetening component other than sugars occurring naturally in the other components a mixture consisting essentially of, on a dry basis,

| | Percent |
|---|---|
| Maltose | About 30 to about 70 |
| Dextrose | About 10 to about 40 |
| Levulose | About 3.5 to about 20 |
| Sucrose | None to about 10 |
| Polysaccharides consisting of penta and higher saccharides | About 10 to about 45 |

3. A sweetening composition consisting essentially of about 70 to 90 percent, dry basis, of a starch hydrolysate having a D.E. of about 24 to 64 percent, maltose content of at least about 40 percent, dry basis, and 30 to 10 percent, dry basis, of a mixture of substantially equal parts of dextrose and levulose.

4. A frozen dessert composition comprising milk solids, fat, stabilizer and emulsifier, and a sweetening composition consisting essentially of, on a dry basis,

| | Percent |
|---|---|
| Maltose | About 30 to about 70 |
| Dextrose | About 10 to about 40 |
| Levulose | About 3.5 to about 20 |
| Sucrose | None to about 10 |
| Polysaccharides consisting of penta and higher saccharides | About 10 to about 45 |

5. A frozen dessert composition comprising fruit puree, stabilizer, and a sweetener consisting essentially of, on a dry basis,

| | Percent |
|---|---|
| Maltose | About 30 to about 70 |
| Dextrose | About 10 to about 40 |
| Levulose | About 3.5 to about 20 |
| Sucrose | None to about 10 |
| Polysaccharides consisting of penta and higher saccharides | About 10 to about 45 |

No references cited.

A. LOUIS MONACELL, *Primary Examiner.*

J. M. HUNTER, *Assistant Examiner.*